United States Patent [19]

Erdmannsdörfer

[11] Patent Number: 4,632,682
[45] Date of Patent: Dec. 30, 1986

[54] CARTRIDGE-TYPE OIL SEPARATOR AIR FILTER

[75] Inventor: Hans Erdmannsdörfer, Ludwigsburg, Fed. Rep. of Germany

[73] Assignee: Filterwerk Mann & Hummel GmbH, Ludwigsburg, Fed. Rep. of Germany

[21] Appl. No.: 822,288

[22] Filed: Jan. 24, 1986

[30] Foreign Application Priority Data

Jan. 24, 1985 [DE] Fed. Rep. of Germany ... 8501736[U]

[51] Int. Cl.⁴ .............................................. B01D 39/08
[52] U.S. Cl. ......................................... 55/498; 55/486; 55/502; 55/504; 55/505; 55/509; 210/315
[58] Field of Search ................. 55/482, 486, 487, 502, 55/498, 500, 503, 504, 505, 507, 509; 210/315, 483, 489, 491

[56] References Cited

U.S. PATENT DOCUMENTS 2,413,769  1/1947  Kasten .................................. 55/486
3,386,230  6/1968  Riesberg et al. ...................... 55/498

FOREIGN PATENT DOCUMENTS 3311682  10/1984  Fed. Rep. of Germany .
1566220   4/1980  United Kingdom .

*Primary Examiner*—Bernard Nozick
*Attorney, Agent, or Firm*—Joseph A. Geiger

[57] ABSTRACT

An oil-separating air filter assembly having a separator element arranged in a closed filter cartridge, the lower axial end cover of which has a female thread by means of which the filter cartridge can be screwed against the upper end face of a separator head. The latter carries a centrally located threaded sleeve and a standpipe forming part of the air outlet channel, the accumulated oil being drained through an annular gap between the sleeve and the standpipe. The air inlet channel is arranged radially outside the center of the separator head, having an annular channel portion in the separator head facing a plurality of inlet passages in the end cover of the filter cartridge.

8 Claims, 1 Drawing Figure

U.S. Patent  Dec. 30, 1986  4,632,682
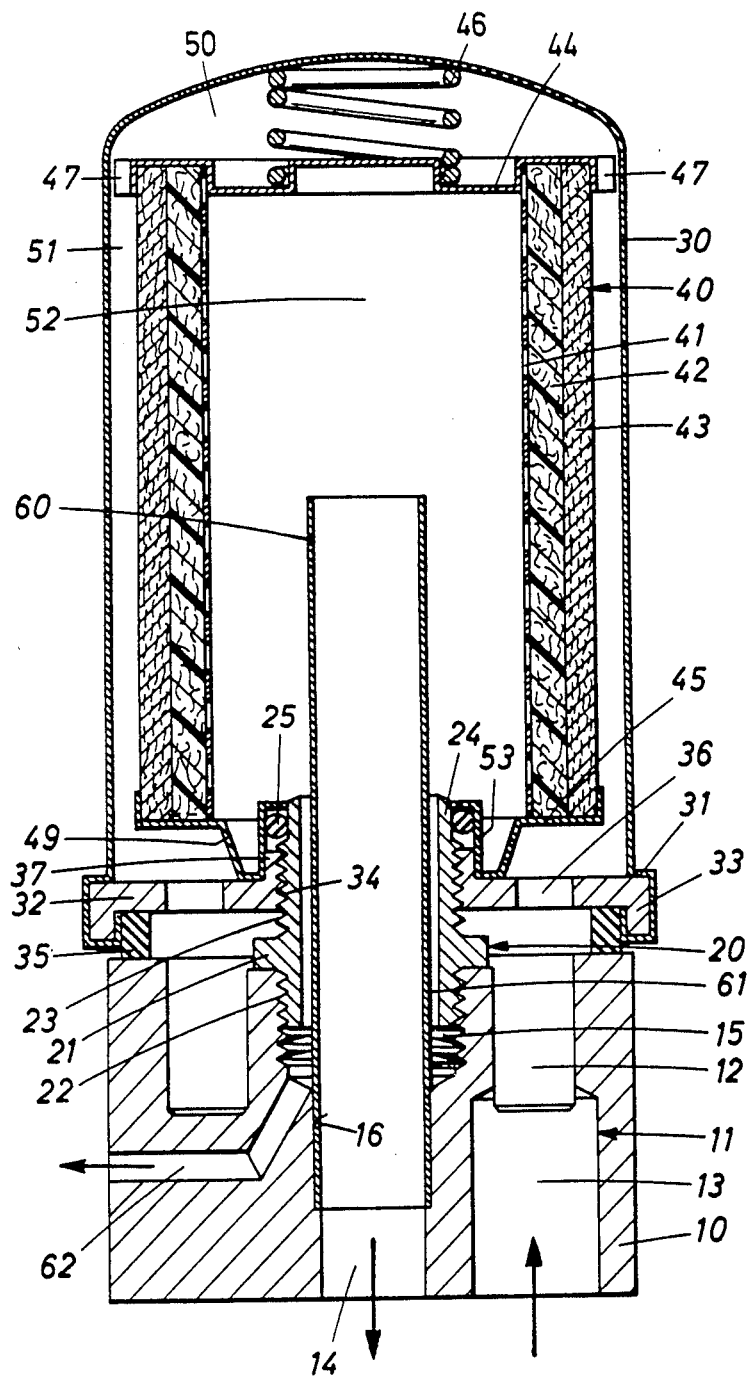

CARTRIDGE-TYPE OIL SEPARATOR AIR FILTER

BACKGROUND OF THE INVENTION

1. Field of the Invention

The present invention relates to air cleaners or air filters and, more particularly, to an oil-separating air filter assembly with an interchangeable filter cartridge for the removal of oil from an oil-entraining air flow.

2. Description of the Prior Art

From the German Offenlegungsschrift 33 11 682 is known an air-drying filter assembly with a separator head which has a centrally located threaded tubular portion onto which is screwed a filter cartridge which contains a water-absorbing filter element. The filter element is travered by a radially converging air flow which enters the filter cartridge through openings which are located radially outside the center of the separator head and exits the filter cartridge through a central outlet opening in the separator head.

The filter cartridge has an axial end wall with a gasket which engages an upwardly facing end face of the separator head. A plurality of openings in the axial end wall allow the incoming air to flow from an annular flow channel in the separator head into the gap between the wall of the filter cartridge and the water-absorbing filter element.

The known water-removing air filter assembly is primarily used in conjunction with air compressors, and especially in air pressure assisted vehicular brake systems. However, the filter element of the known device has a limited absorption capacity, and it must be replaced, whenever it is saturated.

SUMMARY OF THE INVENTION

Underlying the invention is the primary objective of devising an oil-separating filter assembly with an interchangeable filter cartridge by improving upon the known air-drying filter assembly with its interchangeable filter cartridge in such a way that the filter assembly is usable as a device for the removal of oil from an oil-entraining flow of air.

The present invention proposes to attain this objective by suggesting a filter assembly which comprises a separator head with an axially upwardly oriented end face into which opens an inlet channel arranged outside the center axis and an outlet channel arranged in the center axis of the filter assembly. A filter cartridge which is removably clampable to the end face of the separator head by a clamping means encloses a tubular separator element. The latter defines a raw air space between the wall of the filter cartridge and the separator element and a clean air space inside the separator element, the separator element having an air-permeable filter wall which, when traversed by the oil-entraining air flow, traps and coalesces the oil.

The filter cartridge has on its lower side an axial end wall with separate inlet and outlet passages leading from the inlet channel of the separator head to said raw air space and from the clean air space to the outlet channel of the separator head, the axial end wall being preferably an end cover which is permanently attached to the pot-shaped shell of the filter cartridge by means of an inwardly crimped seam.

In order to continually drain the collected oil from the filter assembly, the separator head has a drain channel which leads from the separator head to a bottom portion of the space inside the separator element, where the coalesced oil collects under the influence of gravity.

In a preferred embodiment of the invention, the cartridge clamping means takes the form of a threaded socket which protrudes upwardly from the end face of the separator head, the end cover of the filter cartridge having a female thread enabling the filter cartridge to be screwed against said end face. The threaded socket is preferably seated in a threaded bore of the separator head, surrounding an axial standpipe which is part of the outlet channel and reaches upwardly from a central outlet bore through the threaded socket to a level above the latter.

The drain channel extends axially through the threaded socket, having preferably the form of a radial gap between a central bore in the threaded socket and the outer diameter of the standpipe.

The separator element has upper and lower end discs centering it against the cartridge shell and against the cartridge end cover, respectively, a compression spring arranged between the upper end disc and the upper end wall of the cartridge shell biasing the separator element downwardly against the cartridge end cover.

A gasket arranged in an annular gap between an axially upwardly recessed portion of the lower end disc and an extension on the upper end of the threaded socket serves to separate the inlet passages of the cartridge end cover from the central outlet passage and from the drain channel. A gasket which surrounds the annular opening of the inlet channel on the end face of the separator head is adhesively attached to the underside of the cartridge end cover.

The proposed novel oil separating air filter assembly combines the advantages of quick replaceability of a soiled oil-separating element with the continuous removal of the accumulated oil from the filter assembly. The interchangeable filter cartridge is so arranged that its installation automatically establishes the inlet and outlet connections for the air flow, as well as the drain connection for the oil.

BRIEF DESCRIPTION OF THE DRAWINGS

Further special features and advantages of the invention will become apparent from the description following below, when taken together with the accompanying drawing which illustrates, by way of example, a preferred embodiment of the invention which is represented as follows:

The sole figure shows, in a section taking along an axial center plane, an oil separator air filter embodying the invention.

DESCRIPTION OF THE PREFERRED EMBODIMENT

As can be seen in the drawing, the oil-separating air filter assembly of the invention is a vertically oriented assembly with a vertical center axis. The filter assembly has on its lower side a separator head 10 with a inlet channel 11 for raw air which is arranged radially outside the center axis and consists of a annular channel 12 and an axially oriented inlet bore 13 leading into the annular channel 12. The clean air leaves the separator head 10 centrally through an axial outlet bore 14.

The upper part of the outlet bore 14 has an enlarged diameter, forming a threaded bore 15 by means of which it holds a threaded socket 20. A radial collar 21 of the threaded socket 20 is adjoined on its lower axial side by a threaded end portion 22 and on its upper axail side by a threaded end portion 23. The lower threaded end portion 22 engages the threaded bore 15. The collar 21 positions the threaded socket 20 against an end face on the upper side of the threaded socket 20.

A pot-shaped cartridge shell 30 in the form of a body of rotation covers the upper part of the filter assembly. On its lower end, the cartridge shell 30 has a shoulder 31 positioning an end cover 32 with a downwardly extending cover flange 33. The latter is surrounded by a in inwardly crimped seam of the cartridge shell 30 which presses the end cover 32 against the shoulder 31.

In the center of the end cover 32 is arranged a centering collar 37 which surrounds a threaded bore 34 with which the end cover 32 is threaded onto the upper threaded end portion 23 of the threaded socket 20. A gasket 35 of rectangular cross section, glued to the end cover 32, forms a seal between the upper side of the separator head 10 and the cartridge shell 30, engaging both its end cover 32 and a radially inwardly facing lip portion of the cartridge shell 30. A number of inlet passages 36, arranged on a circle in the end cover 32, lead from the raw air inlet channel 11 to the inside of the cartridge shell 30.

The cartridge shell 30 surrounds a tubular separator element 40 which consists of a cylindrical perforated supporting sleeve 41 on the inner periphery of the separator element 40, an inner separator member 42 of polyester fleece surrounding the supporting sleeve 41, an outer separator member 43 in the form of a pleated hollow cylinder of glass fiber paper, an upper end disc 44, and a lower end disc 45.

The upper end disc 44 closes off the upper end of the separator element 40, supporting a central axially oriented compression spring 46 which, in turn, bears against the domed upper end of the cartridge shell 30. The spring 46 presses the separator element 40 and its lower end disc 45 against the end cover 32. A number of radial protrusions 47 on the circumference of the upper end disc 44 serve to center the separator element 40 against the inner wall of the cartridge shell 30.

The lower end disc 45 closes off the lower end of the separator element 40, having a centering collar 49 by means of which it and the separator element 40 are centered on the centering collar 37 of the end cover 32.

The separator element 40 divides the interior space 50 of the cartridge shell 30 into a raw air space 51 which communicates with the inlet passages 36 of the end cover 32 and a clean air space 52 which is open to the outlet bore 14. In a pipe seat 16 of the outlet bore 14 is engaged a standpipe 60 which reaches upwardly through the threaded socket 20, to approximately mid-height of the separator element 40, while forming a annular gap 61 with the axial bore of the threaded socket 20. A drain channel 62 communicates with the annular gap 61, via the lower end portion of the threaded bore 15.

On the upper end of the threaded socket 20 is arranged an cylindrical extension 24 which cooperates with an upwardly recessed cylindrical wall portion 53 of the lower end disc 45 to form an annular space for an O-ring 25. The O-ring 25 serves to create a hermetic seal which separates the raw air space 51 from the clean air space 52 and from the accumulated oil in the bottom of the separator element.

In operation, the raw air enters through the separator head 10 of the filter assembly, in the direction of the arrow in the inlet bore 13, passing from the latter into the annular channel 12 and, via the inlet passages 36 in the end cover 32, into the raw air space 51.

From the annular raw air space 51, the air flows radially inwardly through the outer separator member 43 and the inner separator member 42, where the minute droplets of oil entrained by the raw air are trapped and coalesced into larger oil droplets which flow downwardly towards the lower end disc 45. Having traversed the separator element 40, the clean air leaves the clean air space 52 through the standpipe 60 and the outlet bore 14.

The oil which collects in the bottom of the separator element 40 flows over the upper extremity of the extension 24 into the annular gap 61 and, via the drain channel 62, into a collecting receptacle which is not shown.

The cartridge shell 30 and its end cover 32 thus form a self-contained filter cartridge which holds the separator element 40. When it becomes necessary to replace the filter cartridge, due to the accumulation of solid matter on the separator element 40, the old filter cartridge is simply removed by unscrewing the cartridge shell 30 from the threaded socket 20, and a new filter cartridge is installed by screwing it onto the upper threaded end portion 23 of the exposed threaded socket 20, until its gasket 35 engages the end face of the separator head 10 to form a seal.

The installation of a filter cartridge automatically establishes all the flow connections for the entry of the raw air into the raw air space 51, for the exit of the clean air through the outlet bore 14, and for the collection of the separated oil in the drain channel 61.

It is to be understood that the invention is not limited in its application to the details of construction and arrangement of parts illustrated in the accompanying drawings, since the invention is capable of other embodiments and of being practiced or carried out in various ways. It is also to be understood that the phraseology or terminology employed herein is for the purpose of description and not of limitation.

I claim the following:

1. An oil-separating air filter assembly with an interchangeable filter cartridge adapted for the removal of the oil from an oil-entraining air flow, the filter assembly comprising in combination:

a separator head defining a vertical center axis for the assembly and an axially upwardly oriented end face;

an inlet channel arranged in the separator head radially outside the assembly center axis and an outlet channel arranged in the separator head in alignment with the assembly center axis, both of said channels having openings in the end face of the separator head, a closed filter cartridge adapted to be clamped against the end face of the separator head, the filter cartridge having on its lower side an axial end wall forming a seal with said end face, said axial end wall having separate inlet and outlet passages which lead from the inlet and outlet channels of the separator head to the inside of the filter cartridge;

means defined by the filter cartridge and by the separator head for removably clamping the filter cartridge to the separator head; and a tubular separator element arranged inside the filter cartridge, at a radial distance from the interior wall of the filter cartridge, the separator element including a lower end disc forming a seal with the axial end wall of the filter cartridge, so as to connect the space inside the separator element to said outlet passage and outlet channel and to connect the space between the separator element and the interior wall of the filter cartridge to said inlet passage and inlet channel, the separator element having an air-permeable filter wall between said two spaces which, when traversed by the oil-entraining air flow, traps and coalesces the oil, the coalesced oil collecting above the lower end disc of the separator element under the influence of gravity; and wherein the filter cartridge comprises a cartridge shell and an end cover attached thereto, the cartridge shell surrounding the tubular separator element and enclosing said element on its upper axial side, the axial end wall of the filter cartridge being formed by said cartridge end cover;

the means for clamping the filter cartridge to the separator head includes a pair of cooperating male and female threaded members defined by the filter cartridge and the separator head and arranged in axial alignment with the assembly center axis, the male threaded member having a central axial bore;

the outlet channel in the separator head includes an outlet bore and a standpipe extending axially upwardly from the outlet bore, through the bore of the male threaded member, to a point which is located a distance above the space where the coalesced oil collects; and the separator head and the axial end wall of the filter cartridge define a drain channel leading from the separator head to the space inside the separator element where the coalesced oil collects, the drain channel being arranged radially outside the standpipe, an axial portion of the drain channel extending through the male threaded member.

2. A filter assembly as defined in claim 1, wherein the male threaded member of the cartridge clamping means is a threaded socket which is attached to the separator head in alignment with the assembly center axis; and the cooperating female threaded member is a threaded bore in the cartridge end cover.

3. A filter assembly as defined in claim 2, wherein a length portion of the drain channel is in the form of an annular gap between the central bore of the threaded socket and the outer diameter of the standpipe.

4. A filter assembly as defined in claim 2, wherein the separator head has in its upper portion a threaded bore which is concentric with and larger in diameter than the standpipe; and the threaded socket has a male thread with which it is engaged in the threaded bore of the separator head.

5. A filter assembly as defined in claim 2, wherein the inlet channel includes an annular channel in the upper part of the separator head with a ring-shaped opening in the end face of the separator head, and an inlet bore communicating with a bottom portion of the annular channel; and the inlet passage in the end cover of the filter cartridge is in the form of a number of axial throughbores in the end cover.

6. A filter assembly as defined in claim 2, wherein the end cover has an axially downwardly extending peripheral flange portion;

the end cover is positioned against a shoulder of the cartridge shell and permanently attached thereto by means of a radially inwardly crimped seam; and the end cover further includes a gasket forming said seal with the end face of the separator head, the gasket being centered by said crimped seam.

7. A filter assembly as defined in claim 2, wherein the separator element further includes a perforated tubular supporting sleeve, and an upper end disc, the two end discs closing off the upper and lower axial ends of the separator element;

the air-permeable filter wall of the separator element is in the form of at least one fibrous tubular separator member which is supported by the upper and lower end discs of the separator element and by the supporting sleeve;

the upper end disc is centered against the inside of the cartridge shell and the lower end disc is centered against the end cover of the filter cartridge; and the lower end disc has an axially upwardly recessed portion surrounding an extension on the upper axial end of the threaded socket so as to form an annular gap inside which is arranged a gasket.

8. A filter assembly as defined in claim 3, wherein the separator element is biased against the end cover of the filter cartridge by means of a compression spring which is arranged axially between the upper end disc of the separator element and an upper axial end wall of the filter cartridge.

* * * * *